US012607513B2

(12) United States Patent
Paredes et al.

(10) Patent No.: US 12,607,513 B2
(45) Date of Patent: Apr. 21, 2026

(54) LIGHT-BASED PROTRACTOR AND USE THEREOF FOR DETECTION OF COLOR ASSOCIATED WITH PHYSICAL COATINGS

(71) Applicant: PPG Industries Ohio, Inc., Cleveland, OH (US)

(72) Inventors: Antonio Paredes, Queretaro (MX); Alison M. Norris, Gibsonia, PA (US); Richard Knight, LaGrange, OH (US); William E. Eibon, Elyria, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 338 days.

(21) Appl. No.: 18/352,337

(22) Filed: Jul. 14, 2023

(65) Prior Publication Data

US 2023/0358613 A1      Nov. 9, 2023

Related U.S. Application Data

(63) Continuation of application No. 17/426,843, filed as application No. PCT/US2020/015586 on Jan. 29, 2020, now Pat. No. 11,747,206.
(Continued)

(51) Int. Cl.
*G01B 11/26* (2006.01)
*G01J 3/02* (2006.01)
(Continued)

(52) U.S. Cl.
CPC .............. *G01J 3/463* (2013.01); *G01B 11/26* (2013.01); *G01J 3/0264* (2013.01);
(Continued)

(58) Field of Classification Search
CPC .......... G01J 3/463; G01J 3/0256; G01J 3/504; G01J 2003/467; G01B 11/26
See application file for complete search history.

(56) References Cited

U.S. PATENT DOCUMENTS

| | | |
|---|---|---|
| 4,479,718 A | 10/1984 | Alman |
| 11,747,206 B2 | 9/2023 | Paredes et al. |

(Continued)

FOREIGN PATENT DOCUMENTS

| | | | | |
|---|---|---|---|---|
| CN | 104114985 A | * 10/2014 | ................ | B60S 5/00 |
| KR | 10-2011-0014244 A | 2/2011 | | |
| WO | 2018/051843 A1 | 3/2018 | | |

OTHER PUBLICATIONS

"ColorCARE® SeeRIGHT ," Global Coating, Retrieved at https://www.basf-coatings.com/global/en/products-and-solutions/automotive_oem_coatings/services/color_care/seeright.html, Retrieved on Mar. 2022, pp. 2.
(Continued)

*Primary Examiner* — Maurice C Smith

(57) ABSTRACT

A system for detection and coating analysis that comprises a digital camera and a light-based protractor positioned adjacent to or on a physical coating surface. The system identifies a particular angular indication being displayed by the light-based protractor. The system then identifies a target color of the physical coating surface and identifies one or more target coating texture characteristics of the physical coating surface. Additionally, the system identifies a proposed coating that comprises a proposed color that matches the target color and proposed coating characteristics that match the one or more target coating texture characteristics. The system then displays, on a user interface, the proposed coating.

20 Claims, 11 Drawing Sheets

Related U.S. Application Data

(60) Provisional application No. 62/801,488, filed on Feb. 5, 2019.

(51) Int. Cl.

| | | |
|---|---|---|
| *G01J 3/46* | (2006.01) | |
| *G01N 21/25* | (2006.01) | |
| *G01N 21/84* | (2006.01) | |

(52) U.S. Cl.
CPC .......... *G01J 3/0272* (2013.01); *G01N 21/255* (2013.01); *G01N 2021/8427* (2013.01); *G01N 2201/0221* (2013.01)

(56) References Cited

U.S. PATENT DOCUMENTS

| | | | | |
|---|---|---|---|---|
| 2002/0163640 | A1 | 11/2002 | Masuda | |
| 2005/0110797 | A1 | 5/2005 | Masuda et al. | |
| 2007/0097119 | A1* | 5/2007 | Steenhoek | G01J 3/504 |
| | | | | 345/426 |
| 2009/0295823 | A1 | 12/2009 | Henry | |
| 2011/0250351 | A1 | 10/2011 | Steenhoek | |
| 2015/0198522 | A1 | 7/2015 | Wei et al. | |
| 2018/0180480 | A1 | 6/2018 | Iida et al. | |
| 2019/0228541 | A1 | 7/2019 | Tanaka | |
| 2022/0113193 | A1 | 4/2022 | Paredes et al. | |

OTHER PUBLICATIONS

"New DuPont(TM) AccuAngle(TM) Protractor Improves Automotive Color Communications," Retrieved at https://www.theautochannel. com/news/2004/04/01/187378.html, Retrieved on Mar. 2022, pp. 2.

International Search Report & Written Opinion for application No. PCT/US2020/015586 mailed on May 14, 2020.

Kristin J. Dana, et al: "Reflectance and Texture of Real-World Surfaces Authors' addresses: K", ACM Transactions on Graphics, Jan. 1, 1999, pp. 1-34, https://ww1.cs.columbia.edu/CAVE/publications/ pdfs/ Dana_TOG99.pdf.

Notice of Allowance received for U.S. Appl. No. 17/426,843, mailed on Apr. 17, 2023, 8 pages.

* cited by examiner

100

100

100

100

700

100

Coating Protractor And Analysis Software 730

Image Processing Unit
760

710

Computer-
Storage Media
740

Coating Processing Unit
770

Angle Processing
Unit 780

Texture Processing
Unit 782

Processor(s)
750

Color Processing
Unit 784

720

800

Position A Light-Based Protractor
810

Identify A Desired Angle
820

Identify An Angular Indication
830

Change A Viewing Position
840

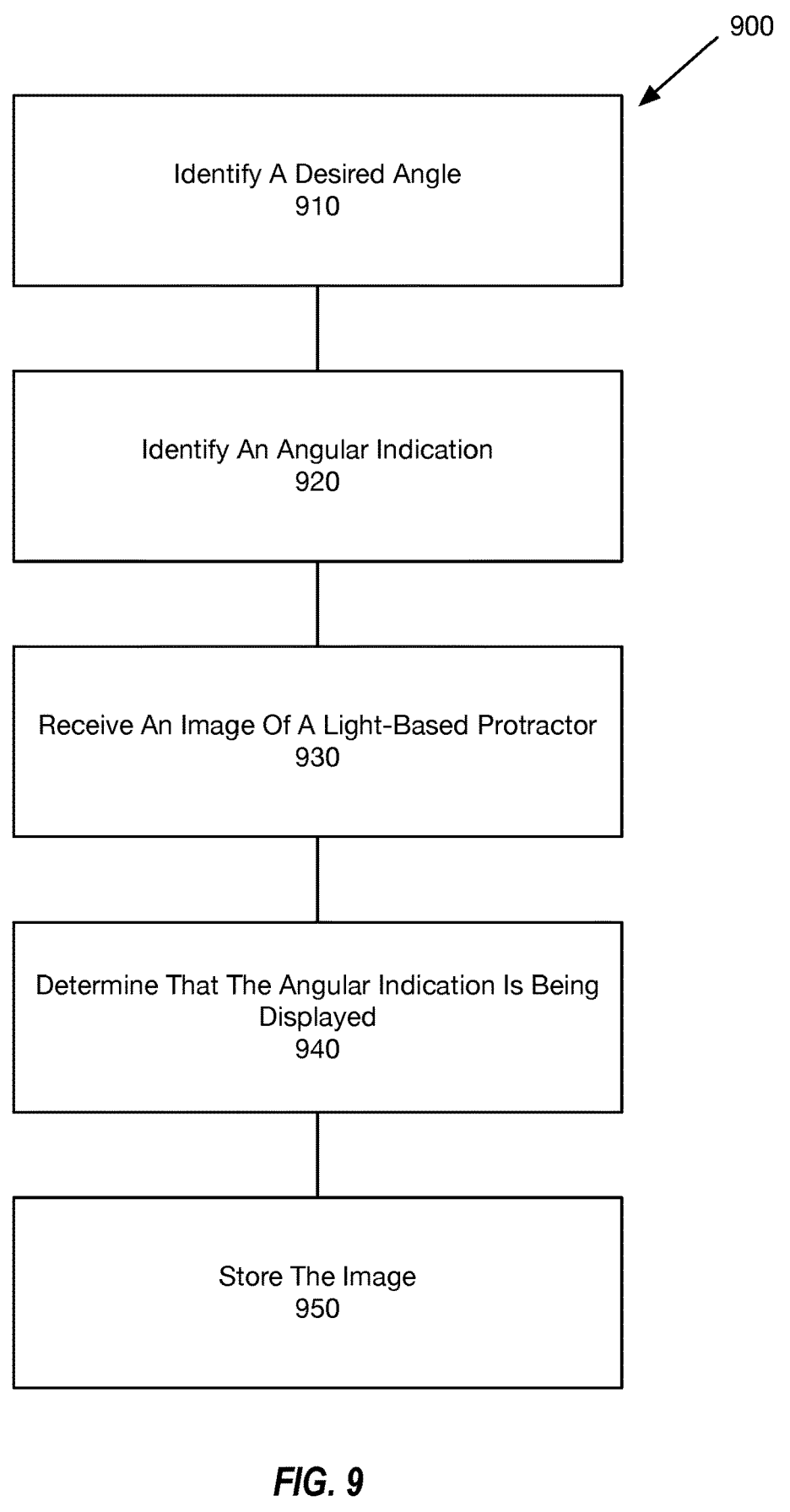

900

```
┌─────────────────────────────────────┐
│                                     │
│      Identify A Desired Angle        │
│                910                   │
│                                     │
└─────────────────────────────────────┘
                  │
┌─────────────────────────────────────┐
│                                     │
│     Identify An Angular Indication   │
│                920                   │
│                                     │
└─────────────────────────────────────┘
                  │
┌─────────────────────────────────────┐
│                                     │
│ Receive An Image Of A Light-Based Protractor │
│                930                   │
│                                     │
└─────────────────────────────────────┘
                  │
┌─────────────────────────────────────┐
│                                     │
│ Determine That The Angular Indication Is Being │
│              Displayed               │
│                940                   │
│                                     │
└─────────────────────────────────────┘
                  │
┌─────────────────────────────────────┐
│                                     │
│          Store The Image             │
│                950                   │
│                                     │
└─────────────────────────────────────┘
```

*FIG. 9*

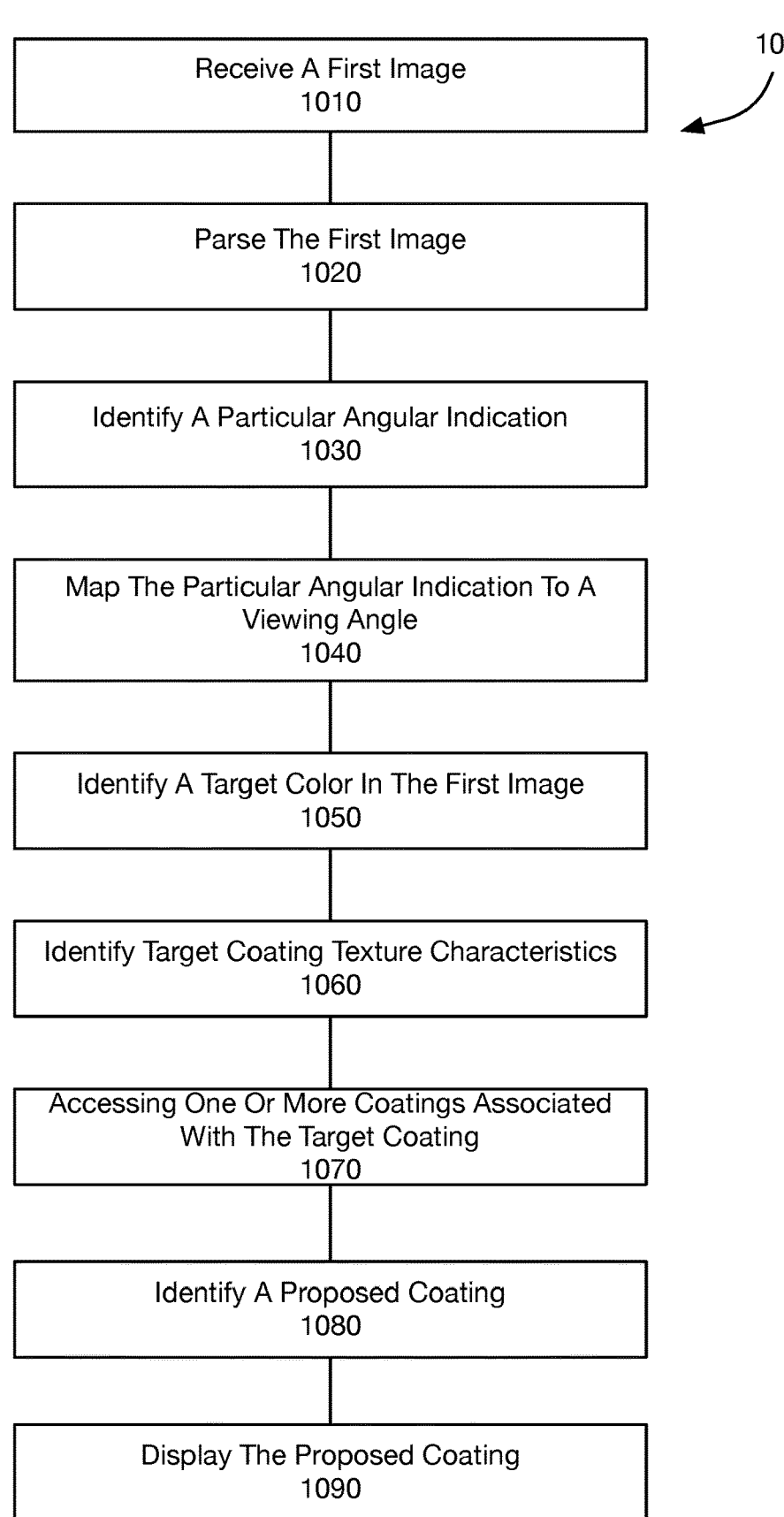

1000

Receive A First Image
1010

Parse The First Image
1020

Identify A Particular Angular Indication
1030

Map The Particular Angular Indication To A Viewing Angle
1040

Identify A Target Color In The First Image
1050

Identify Target Coating Texture Characteristics
1060

Accessing One Or More Coatings Associated With The Target Coating
1070

Identify A Proposed Coating
1080

Display The Proposed Coating
1090

*FIG. 10*

LIGHT-BASED PROTRACTOR AND USE THEREOF FOR DETECTION OF COLOR ASSOCIATED WITH PHYSICAL COATINGS

CROSS-REFERENCE TO RELATED APPLICATIONS

This application is a continuation of U.S. patent application Ser. No. 17/426,843 entitled "Light-Based Protractor and Use Thereof for Detection of Color Associated with Physical Coatings," filed on Jul. 29, 2021, which application is a national stage entry of PCT Application No. PCT/US20/15586 entitled "LIGHT-BASED PROTRACTOR AND USE THEREOF," filed on Jan. 29, 2020, which application claims priority to and the benefit of U.S. Provisional Application Ser. No. 62/801,488 entitled "COLOR ANGLE DETECTION DEVICE", filed on Feb. 5, 2019. The entire contents of each of the above applications is incorporated herein by reference in their entireties.

TECHNICAL FIELD

The present disclosure relates to systems, methods, and devices for detection of a color associated with a physical coating.

BACKGROUND OF THE INVENTION

Modern coatings provide several important functions in industry and society. Coatings can protect a coated material from corrosion, such as rust. Coatings can also provide an aesthetic function by providing a particular color and/or texture to an object. For example, most automobiles are coated using paints and various other coatings in order to protect the metal body of the automobile from the elements and also to provide aesthetic visual effects.

In view of the wide-ranging uses for different coatings, it is often necessary to analyze a coating for color matching purposes or for conformity with a predetermined standard. For instance, it might be necessary to identify whether a coating on an automobile body matches the coating on the automobile bumper. If the coatings do not match, it may result in an unpleasant appearance. There are many opportunities for new methods and systems that improve the analysis of coatings.

BRIEF SUMMARY OF THE INVENTION

The present invention can comprise systems, methods, and apparatus configured for detection and coating analysis. The method may comprise receiving with a digital camera a first image of a light-based protractor positioned adjacent to or on a physical coating surface. The method also comprises parsing, with a computer processor, the first image to identify the light-based protractor positioned adjacent to or on the physical coating surface. Additionally, the method comprises identifying a particular angular indication being displayed by the light-based protractor. The method further comprises mapping the particular angular indication to a particular viewing angle at which the digital camera captured the first image with respect to the light-based protractor. In addition, the method comprises parsing, with a processor, the first image to identify a target color of the physical coating surface. The method also comprises parsing, with the computer processor, the first image to identify one or more target coating texture characteristics of the physical coating surface. Additionally, the method comprises accessing, within a coating database, one or more coatings associated the target color, wherein each of the one or more coatings is associated with data structures that indicate angle-specific proposed coating texture characteristics at the particular viewing angle. Further, the method comprises identifying, within the coating database, a proposed coating that comprises a proposed color that matches the target color and proposed coating characteristics that match the one or more target coating texture characteristics. Further still the method comprises displaying, on a user interface, the proposed coating.

The present invention may also relate to a computer system for angle detection and coating analysis. The computer system comprises one or more processors and one or more computer-readable media having stored thereon executable instructions that when executed by the one or more processors configure the computer system to perform various acts. The computer system may receive with a digital camera a first image of a light-based protractor positioned adjacent to or on a physical coating surface. The computer system then parses, with a computer processor, the first image to identify the light-based protractor positioned adjacent to or on the physical coating surface. The computer system also identifies a particular angular indication being displayed by the light-based protractor. Additionally, the computer system maps the particular angular indication to a particular viewing angle at which the digital camera captured the first image with respect to the light-based protractor. The computer system parses, with a processor, the first image to identify a target color of the physical coating surface. In addition, the computer system parses, with the computer processor, the first image to identify one or more target coating texture characteristics of the physical coating surface. The computer system accesses, within a coating database, one or more coatings associated the target color, wherein each of the one or more coatings is associated with data structures that indicate angle-specific proposed coating texture characteristics at the particular viewing angle. Further, the computer system identifies, within the coating database, a proposed coating that comprises a proposed color that matches the target color and proposed coating characteristics that match the one or more target coating texture characteristics. Further still, the computer system displays, on a user interface, the proposed coating.

The present invention may also relate to a system for using a light-based protractor to detect angles with respect to a physical coating, for example making use of the method for color angle detection described above and in more detail below. The light-based protractor may comprise an optical element constructed of an optically interactive component, the optically interactive component comprising angle-dependent properties responsive to light. The optical element may be positioned adjacent to a physical coating surface and exposed to a light source. Responsive to the light source, the optically interactive component may reflect, refract, or transmit particular wavelengths of light at particular angles with respect to the optical element and the physical coating surface. The light-based protractor may be configured to be handheld.

The present invention may also comprise a computer system in communication with a digital camera. The computer system may comprise one or more processors and one or more computer-readable storage media having stored thereon executable instructions that when executed by the one or more processors configure the computer system to perform various actions, such as the following. Thus, the computer system may identify a particular desired viewing angle with respect to the physical coating surface. The computer system may also identify a particular angular indication displayed by the light-based protractor at the particular desired angle. The computer system may then receive with the digital camera an image of the light-based protractor adjacent to the physical coating surface. Additionally, the computer system may determine, with the one or more processors, that the particular angular indication is being displayed by the light-based protractor. Further, the computer system can store the image of the light-based protractor adjacent to the physical coating surface within memory.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims or may be learned by the practice of such exemplary implementations as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof, which are illustrated in the appended drawings. Understanding that these drawings depict only exemplary embodiments of the invention and are not therefore to be considered to be limiting of its scope, the invention will be described and explained with additional specificity and detail through the use of the accompanying drawings which are described below.

FIG. 9 illustrates a flowchart of acts in another method for identifying angles using a light-based protractor.

FIG. 10 illustrates a flowchart of acts in another method for identifying angles using a light-based protractor.

DETAILED DESCRIPTION

Figure 1:
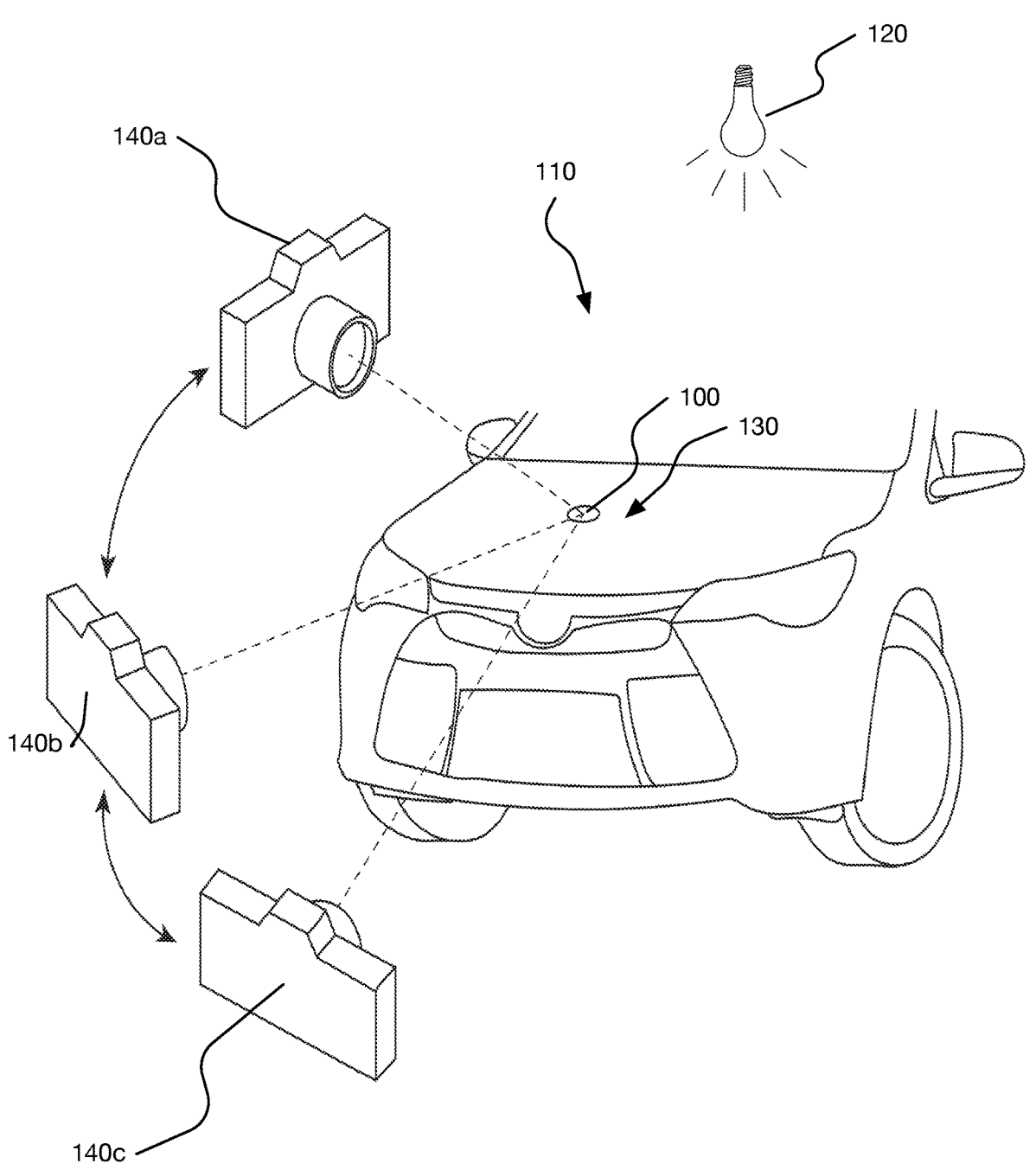
FIG. 1 illustrates a schematic diagram of a digital camera taking images of a light-based protractor positioned on a vehicle.

The present invention extends to the use of one or more digital cameras and a light-based protractor to identify coating characteristics of a physical coating surface. As used herein, a "physical coating surface" comprises any physical surface that has a coating applied thereon. The coatings may comprise paint, stains, industrial coatings, and any other coating that is applied to a physical surface. Additionally, as used herein, a "light-based protractor" comprises any physical device that aids in the measurement of viewing angles through the use of light reflection, refraction, transmission, scattering, and/or polarization.

Many modern coatings comprise highly complex formulas and attributes. For example, many automotive coatings comprise textures, such as aluminum flakes. These textured coatings provide a visually appealing aesthetic than can change depending upon the angle at which the physical coating surface is viewed. For instance, at certain angles the sparkles creating the aluminum flakes may be particularly apparent, whereas at other angles the sparkles may be nearly undetectable.

The complexity of modern coatings creates several significant challenges in the technical field of coatings. For example, when textured coatings are applied to cars, they are often applied to different components of the car at different times and even at completely different locations. For instance, a car fender may be coated on the assembly line, while a corresponding car bumper is coated at a different factory and then later attached to the car. Once the different components of the car are attached, it is often necessary to verify that the different coatings applied to the different components match.

The process of verifying that the different coatings applied to the different components match is a challenging undertaking. Due to the angle-dependent characteristics of the physical coating surfaces, such as sparkles caused by aluminum flakes, it can be extremely difficult to verify that the coatings do in fact match. For example, the coatings may appear to match when viewed at a 90° angle but may not match at a 45° angle. Further, there may be specific coating characteristics that are supposed to appear at a particular angle, such as 45°, but not appear at another angle, such as 170°.

To further add complexity to this problem, many coatings are applied to non-planar surfaces, such as a car fender. The non-planar nature of the surface makes it extremely difficult for a viewer to determine the angle at which he or she is viewing the physical coating surface. As an example, one will appreciate that it may at times be necessary to compare the coatings applied to the fender and the bumper to each other while attempting to identify the two different viewing angles for the non-planar surfaces of both the fender and the bumper.

Accordingly, there are several challenges in the field that are present relating to properly and efficiently identifying a viewing angle of a physical coating surface. In particular, there are challenges relating to the identification of viewing angles on a non-planar physical coating surface using methods and/or apparatuses that can be easily placed on the physical coating surface without damaging the physical coating surface itself in the process. The challenges associated with properly identifying a viewing angle of a coating also create challenges related to the automation of the processes required to correctly identify a coating. One will appreciate that while the above examples were directed toward textured coatings and automotive applications, similar challenges may arise in any number of different applications with any number of different coatings.

Turning now to the Figures, FIG. 1 illustrates a schematic diagram of a digital camera 140(a-c) taking images of a light-based protractor 100 positioned on a vehicle 110. As depicted relative to the vehicle 110, the light-based protractor 100 may be sized such that it is configured to be handheld. For instance, the light-based protractor 100 may be square or rectangular with dimensions of 15 cm by 15 cm, 15 cm by 10 cm, 10 cm by 10 cm, or any other size that allowed for easy handheld use of the light-based protractor 100. Alternatively, the light-based protractor 100 may be circular with a radius of 15 cm, 10 cm, or any other size that allowed for easy handheld use of the light-based protractor 100. Further, the light-based protractor 100 may comprise a physical form such that it can be placed on a surface of a physical coating surface 130, such as the hood of the vehicle 110. For example, the light-based protractor may comprise a substantially planar base, a flexible base that at least partially conforms to the surface upon which is it set, and/or a base material that will not scratch or otherwise damage the physical coating surface 130.

The light-based protractor 100 may comprise an optical element constructed of an optically interactive component. As used herein, an "optically interactive component" comprises a material or element with angle-dependent properties responsive to light. As used herein, "angle-dependent properties" are relative to a viewing angle of a user or user device. As such, the optically interactive component comprises a material or element with angle-dependent properties responsive to light that change based upon the viewing angle of the user or user device. For example, the optically interactive component may comprise any component that causes the dispersion of light that passes through the optically interactive component. The optically interactive component may comprise one or more of a diffraction grating, a prism, a hologram (such as a holographic grating), effect pigments with predetermined angular properties, layered films, lenses (such as dichroic stacked lenses), nanoparticles, or any other optically interactive component with angular-dependent properties. The optically interactive component may cause light to reflect, refract, transmit, scatter, and/or polarize light depending upon the angle at which the optically interactive component is viewed.

The optical element can be positioned adjacent to, for example on a physical coating surface and exposed to a light source. As shown in FIG. 1, the optical element within the light-based protractor 100 may for example be positioned on the physical coating surface 130 of the vehicle's 110 hood and exposed to a light source 120. The light source 120 is depicted as a light bulb but may include any type of light source, including the sun or a controlled lighting booth. Responsive to the light source 120, the optically interactive component reflects, refracts, transmits, scatters, or polarizes particular wavelengths of light at particular angles with respect to the optical element within the light-based protractor 100 and the physical coating surface 130 of the vehicle.

Using the light-based protractor 100 a user can easily and efficiently identify the angle at which they are viewing the physical coating surface 130 adjacent to the light-based protractor 100. For example, a digital camera 140(*a-c*) may take images of the light-based protractor 100 positioned adjacent to or on a physical coating surface 130. An associated computer system (shown as 720 in FIG. 7) may also determine that a particular light-based protractor 100 disperses blue light when viewed at an elevation of 15°. As such, the digital camera 140(*a-c*) can change position with respect to the vehicle 110 and the light-based protractor 100 until the digital camera 140(*a-c*) sees a blue light reflecting, refracting, transmitting, scattering, or polarizing from the light-based protractor 100. At which point, the computer system 720 can make observations regarding the physical coating surface adjacent to the light-based protractor 100 knowing that image depicts the physical coating surface 130 at a 15° angle.

An example of a user relying upon a light-based protractor 100 within industry may comprise the user attempting to validate that an automotive coating meets pre-determined specifications with respect to angular color. The analysis may occur by human eye and/or with a computer-based camera system. The specifications of the color may include characteristics that must be validated on a per-angle basis and specific angles.

To perform the validation, the computer system 720 may identify a particular desired viewing angle with respect to the physical coating surface 130. For instance, the computer system 720 may be attempting to validate that a particular intensity and/or color of sparkle is apparent at 45°. Upon identifying 45° as the desired viewing angle, the computer system 720 identifies a particular angular indication displayed by the light-based protractor 100 at the particular desired angle. As used herein an "angular indication" comprises a visual display on the light-based protractor 100 that correlates to a viewing angle of a user or a user device with respect to the light-based protractor 100. For instance, the light-based protractor 100 may reflect, refract, transmit, scatter, or polarize a green light when viewed at 45°. Additionally or alternatively, a texture-effect based light-based protractor 100 may sparkle a particular color at 45°.

Once the particular angular indication has been identified, the digital camera 140(*a-c*) moves with respect to the light-based protractor 100 and the vehicle 110 until the light-based protractor 100 displays the particular angular indication that is associated with 45°. The digital camera 140(*a-c*) may automatically move around the vehicle using a wheels, tracks, a quadrotor, a human carrying the digital camera, or any other type of movement system. Once the computer system 720 identifies that the particular angular indication is being displayed, the computer system 720 validates the particular intensity and/or color sparkle that was specified to occur at 45°.

As explained above, the validation may occur, at least in part, through the use of a digital camera. For example, FIG. 1 depicts a digital camera 140 shown taking images at multiple locations, which are designated as 140(*a-c*). As such, the digital camera 140 captures multiple images of the light-based protractor 100 on the physical coating surface 130. The capturing of the images may comprise taking multiple individual pictures and/or recording a movie from a variety of different locations and associated angles.

A computer system 720 may then determine, with the one or more processors, that the particular angular indication is being displayed by the light-based protractor 100. For example, the computer system may determine, in real-time or at a later time, that the light-based protractor 100 is reflecting, refracting, or transmitting a green light and thus indicating that the viewing angle is the 45° desired viewing angle. The computer system then stores within memory the image of the light-based protractor on the physical coating surface 130 at the desired viewing angle. The stored image can then be validated using a human user who views the stored image and/or the stored image can be validated by processing through an image processing unit (shown as 760 in FIG. 7).

Figure 2:
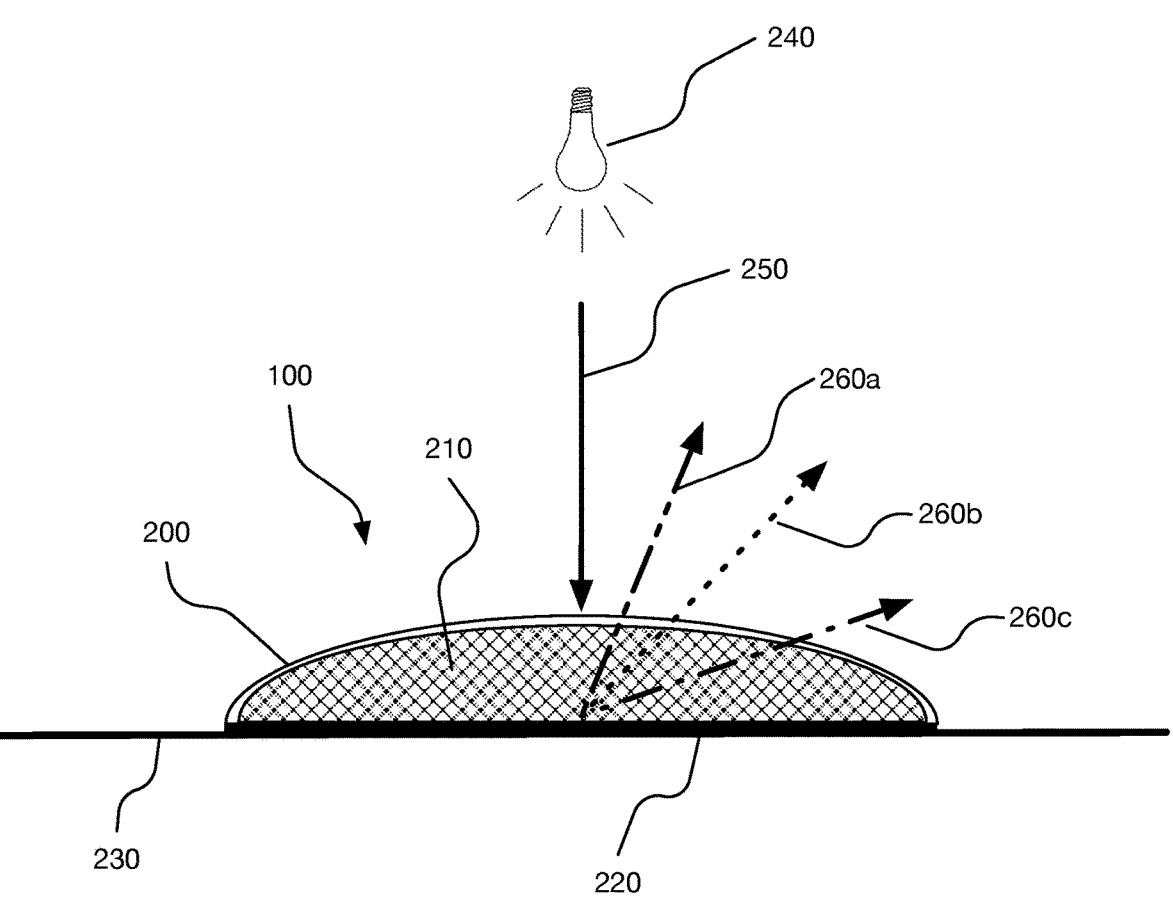
FIG. 2 illustrates a schematic diagram of a light-based protractor.

FIG. 2 illustrates a schematic diagram of a light-based protractor 100. In the depicted example, the light-based protractor 100 comprises a protective layer 200. The protective layer is configured to protect the optical element 210 from damage. The protective layer may comprise a plastic protective layer, a glass protective layer, or any of type of material that does not interfere with the operation of the optical element 210 but still provides protective characteristics. Alternatively, the light-based protractor 100 may forgo a protective layer 200.

The depicted light-based protractor 100 also comprises a mounting layer 220 that is configured to mount the light-based protractor 100 on the physical coating surface 230. The mounting layer 220 may be attached to the optical element 210. The mounting layer 220 may comprise a high-friction substance such as a rubber surface. The high-friction surface is configured to hold the light-based protractor 100 to the physical coating surface 230 without damaging the physical coating surface 230. Additionally or alternatively, the mounting surface 220 may also comprise a magnetic surface attached to the optical element 210, the magnetic surface allowing the user to removably attach the light-based protractor 100 to the physical coating surface 230, when magnetizable. e.g. a coated surface of a ferrous metal substrate. Accordingly, the mounting layer 220 may be configured to mount the light-based protractor 100 to angled surfaces.

FIG. 2 also depicts a light source 240 emitting light 250 towards the light-based protractor 100. The depicted optical element 210 comprises an optically interactive component that causes the dispersion of light. As such, the incoming light 250 is dispersed with specific wavelengths of light 260(a-c) reflected, refracted, or transmitted at specific angles. Further, the depicted light-based protractor 100 is formed, at least in part, into a hemispherical shape. The hemispherical shape of the optically interactive component may provide angle-dependent properties responsive to light with respect to angles of elevation. As such, the light-based protractor 100 displays angular indications with respect to angles of elevation as well as, or instead of, circumferential angles.

Figure 3A:
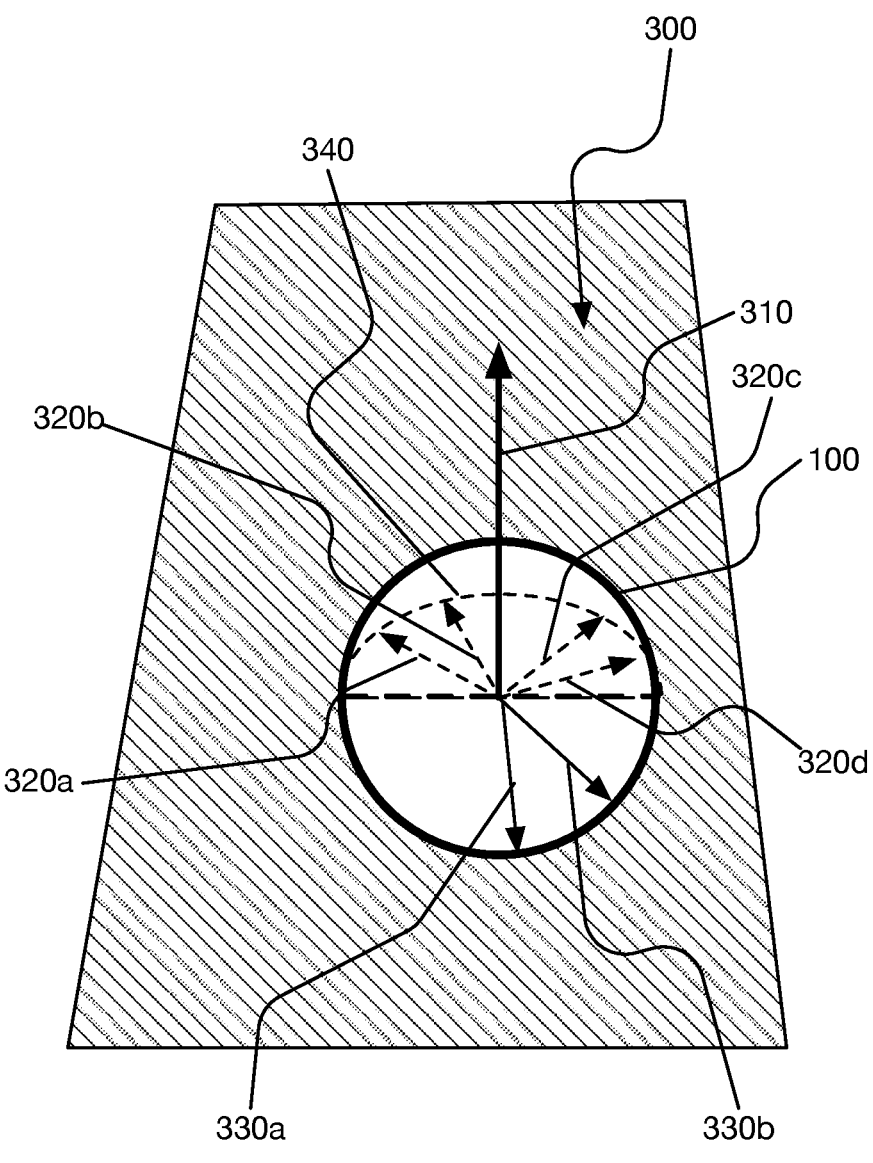
FIG. 3A illustrates a schematic diagram of a light-based protractor on a physical coating surface.

FIG. 3A illustrates a schematic diagram of a light-based protractor 100 on a physical coating surface 300. A normal vector 310 is depicted extending from the center of the light-based protractor 100. The normal vector 310 is provided for the sake of explanation and angular reference. Additionally, a semi-hemispherical plane 340 is depicted that intersects with the normal vector 310 that is also depicted for the sake of explanation and angular reference.

Upon receiving light from a light source, the light-based protractor 100 disperses the light at various different wavelengths at particular angles 320(a-d) along the semi-hemispherical plane 310. FIG. 3A also illustrates that wavelengths of light may disperse various different wavelengths of light at particular azimuthal angles 330(a, b). One will appreciate that while only a select number of angles 320(a-d) are depicted, in practice, the dispersion may comprise a continuous range of angle each associated with the emission of a unique wavelength of light.

Figure 3B:
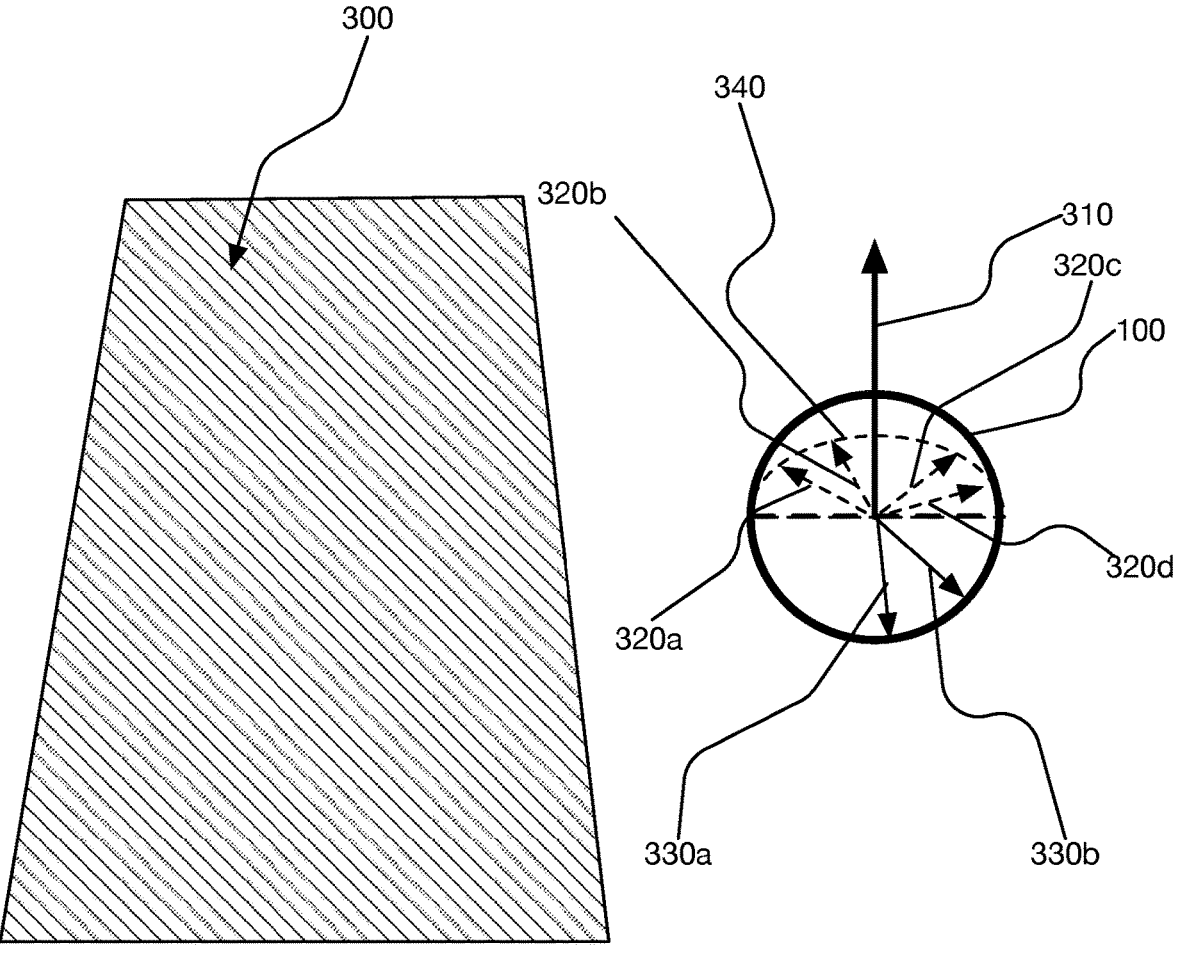
FIG. 3B illustrates a schematic diagram of a light-based protractor adjacent to a physical coating surface.

FIG. 3B illustrates a schematic diagram of a light-based protractor 100 adjacent to a physical coating surface 300. As used herein, a light-based protractor 100 is adjacent to a physical coating surface 300 when the light-based protractor 100 is near the physical coating surface 300, sharing a physical border with the physical coating surface 300, and/or on top of the physical coating surface 300. The same components and labels of FIG. 3A are replicated in this example. In the depicted example, the light-based protractor 100 operates while positioned not directly on the actual physical coating surface 300. In particular, the light-based protractor 100 is depicted adjacent to the physical coating surface 300.

The light-based protractor 100 may function as described herein while being positioned in a variety of different positions relative to the physical coating surface 300. The light-based protractor 100 may be mounted over a base where the physical coating surface 300 will be positioned. For instance, the light-based protractor 100 may be positioned on a base in a light booth where the physical coating surfaces 300 are positioned for evaluation. As such, in some configurations, the light-based protractor 100 may be positioned in a variety of different positions and configurations around a physical coating surface 300 and function as disclosed herein.

Figure 4:
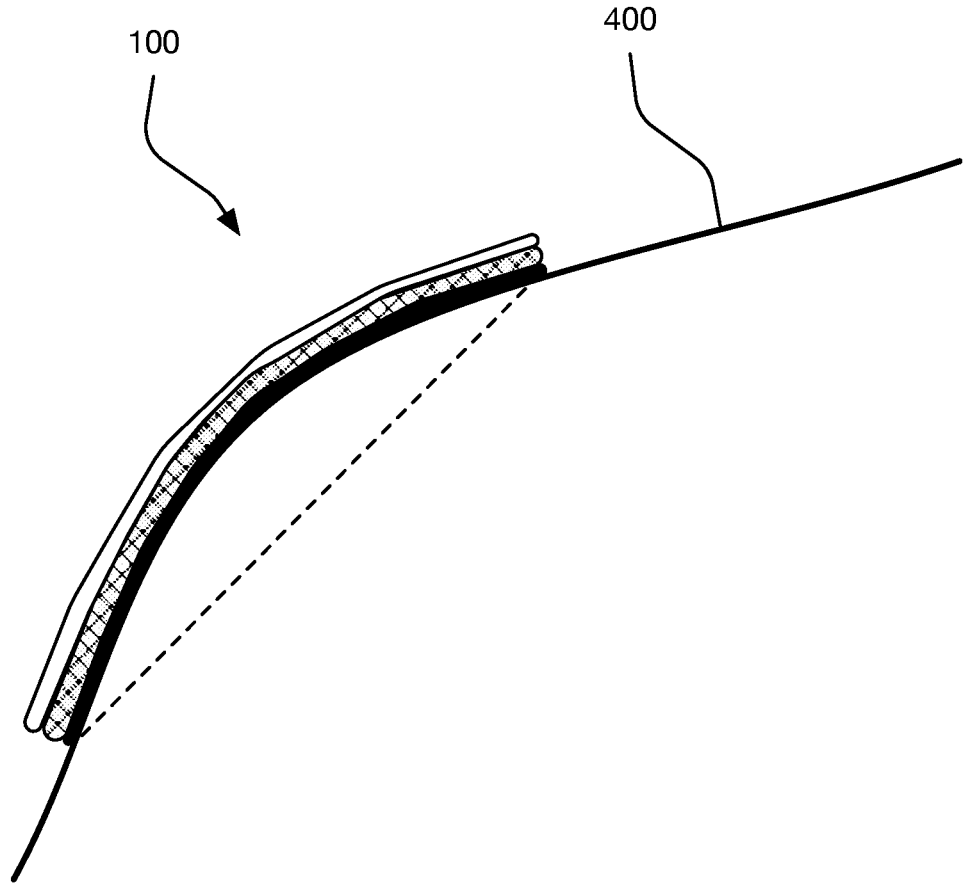
FIG. 4 illustrates a schematic diagram of another light-based protractor on another physical coating surface.

FIG. 4 illustrates a schematic diagram of another light-based protractor 100 on another physical coating surface 400. In the depicted example, the physical coating surface 400 is non-planar and comprises a rolling slope. As depicted, the light-based protractor 100 may comprise a formable material that physically conforms to a non-planar surface of the physical coating surface 400. For example, the optical element (shown as 210 in FIG. 2) may comprise a diffraction grating thin enough to bend. The mounting layer (shown as 220 in FIG. 2) may comprise a rubber material that is bendable. As such, when placed on a non-planar physical coating surface 400, the light-based protractor 100 may conform to the shape of the surface.

Figure 5A:
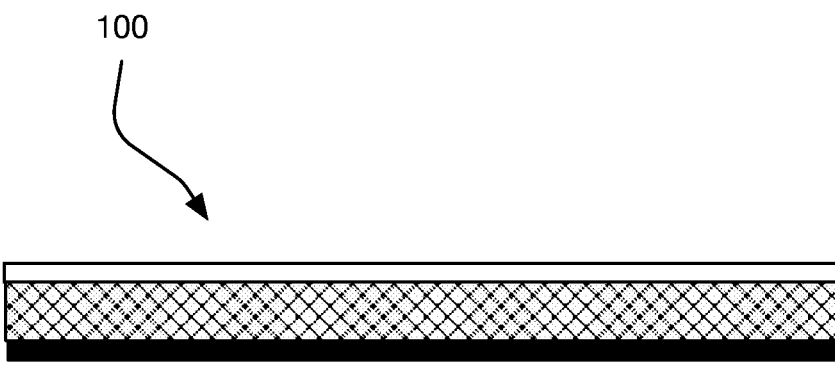
FIG. 5A illustrates a schematic diagram of a side view of a light-based protractor.
Figure 5B:
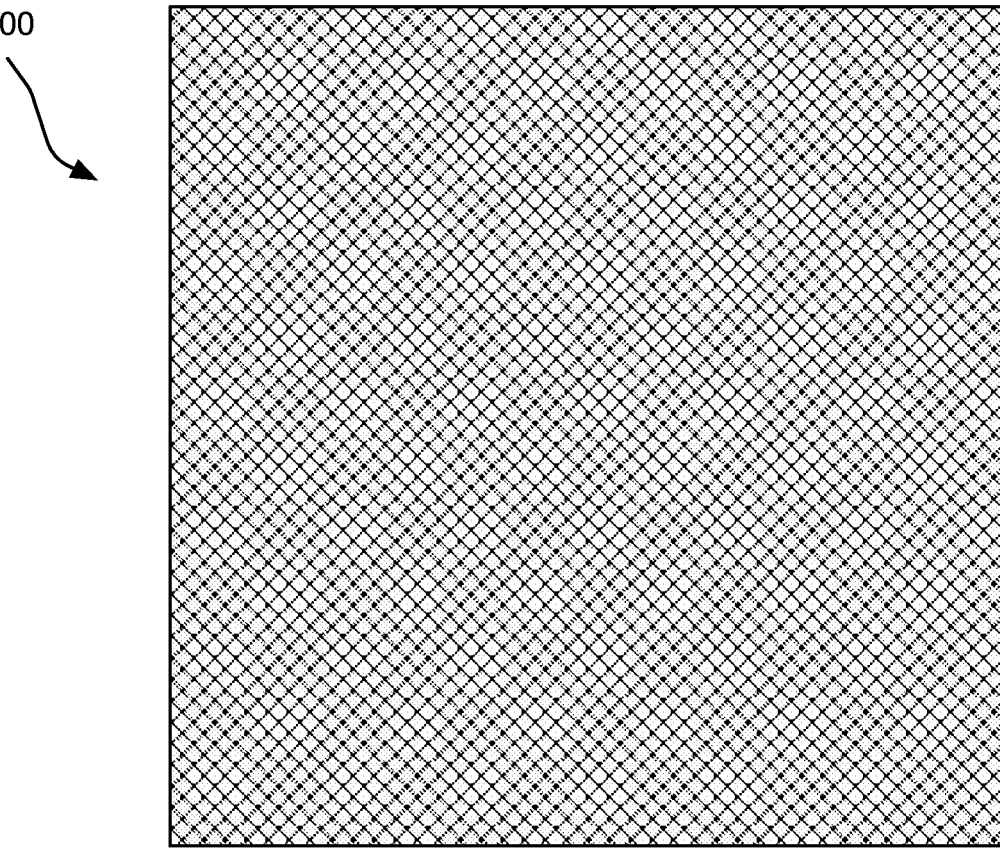
FIG. 5B illustrates a schematic diagram of a top view of a light-based protractor.
Figure 6A:
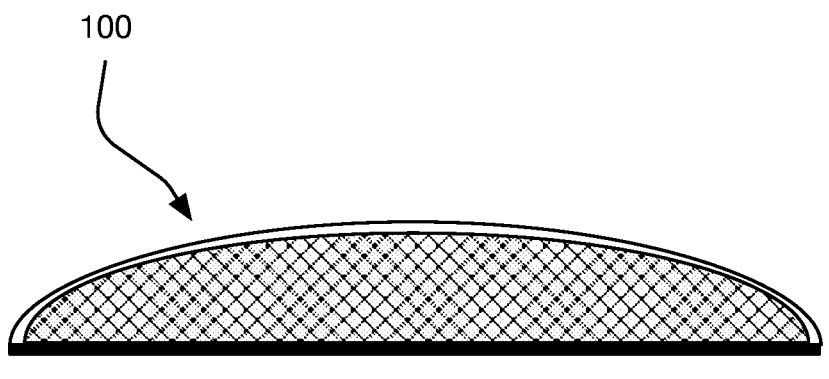
FIG. 6A illustrates a schematic diagram of a side view of a light-based protractor.
Figure 6B:
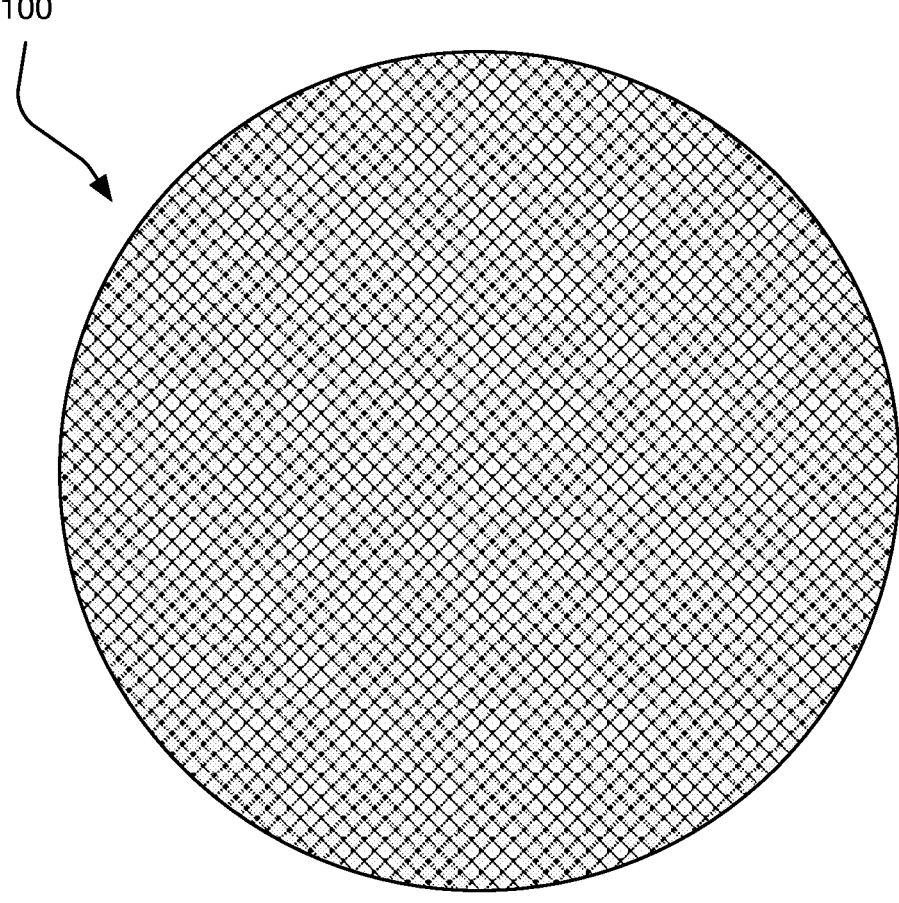
FIG. 6B illustrates a schematic diagram of a top view of a light-based protractor.

FIGS. 5A and 5B illustrate schematic diagrams of a light-based protractor 100. As depicted, in some examples, a light-based protractor 100 may comprise a square planar shape. For example, the light-based protractor 100 may comprise a printed diffraction grating that is formed in a flat square shape. A flat light-based protractor 100 may provide mobility benefits that allow the device to more easily be carried in the pocket of a user and more easily placed on a non-planar surface. In contrast, FIGS. 6A and 6B illustrate schematics diagram of a light-based protractor 100 that comprise a hemispherical shape. In some examples, the hemispherical shape may allow an optical element to reflect, refract, or transmit continuous and identifiably distinct angular indications, such as unique wavelengths of light, in both planar and azimuthal angles.

Figure 7:
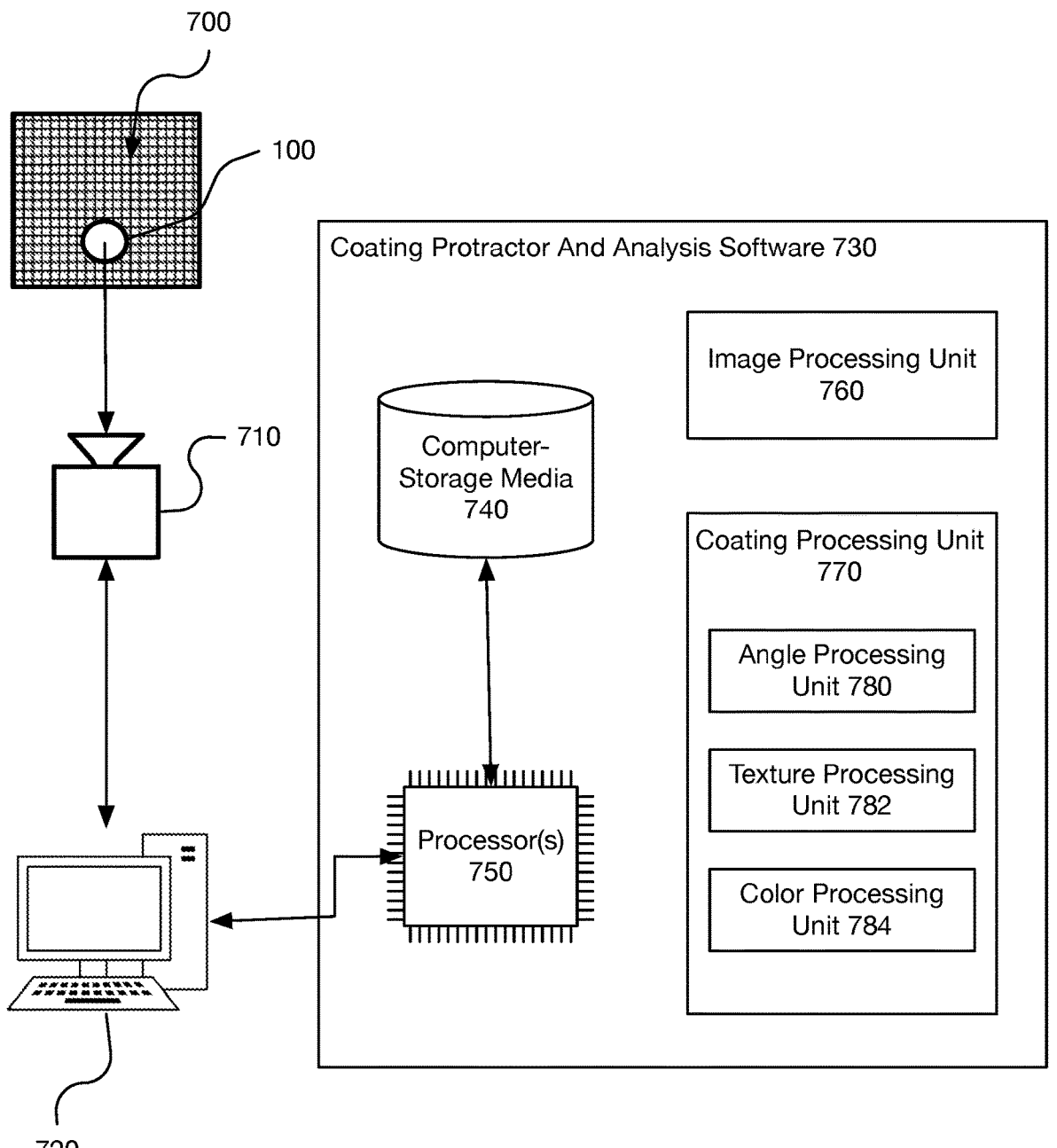
FIG. 7 illustrates a schematic diagram of a computer system for identifying angles using a digital camera and a light-based protractor.

FIG. 7 illustrates a schematic diagram of a computer system 720 for identifying angles using a digital camera 710 and a light-based protractor 100. The computer system 720 is in communication with a digital camera 710. While the depicted digital camera 710 and computer system 720 are shown separately, they may be integrated into a single device. For example, a smart phone may comprise an integrated computer system and camera in accordance with the present invention.

The computer system comprises one or more processors 750 and one or more computer-storage media 740 having stored thereon executable instructions that when executed by the one or more processors configure the computer system to perform acts within a coating protractor and analysis software application 730. The coating protractor and analysis software application 730 may be configured to receive from the digital camera 710 images of the physical coating surface 700 and the light-based protractor 100. The coating protractor and analysis software application 730 may further be configured to process the captured images and identify various coating characteristics with respect to different angles of view. For example, the coating protractor and analysis software application 730 may be configured to identify XYZ/CIELAB/RGB data, spectral data, spatial data, illuminance data (e.g., intensity, lighting color, etc.) and contextual data (e.g., surroundings, dirtiness of film, color harmony information, etc.).

For example, a user may position a light-based protractor 100 adjacent to or on a physical coating surface 700. The coating protractor and analysis software application 730 may be configured to identify a particular desired viewing angle with respect to the physical coating surface. The coating protractor and analysis software application 730 may identify the particular desired viewing angle by receiving the particular desired angle from a user through a user interface. Additionally or alternatively, the coating protractor and analysis software application 730 may also receive the particular desired viewing angle from a database stored within the computer-storage media 740. For instance, a user may indicate that the coating protractor and analysis software application 730 is validating a particular type of coating.

In response to the user's input, the coating protractor and analysis software application 730 may look-up the particular type of coating and its specification within the database stored in the computer-storage media 740. The specification may comprise particular angles of interest along with specified characteristics at those angles. Further, the database may also comprise particular angular indications that are associated with each particular angle of interest. For example, the database may indicate that the particular types of coating should comprise a specific color of texture sparkles when viewed at 70°. Upon identifying that the particular angle of interest is 70°, the coating protractor and analysis software application 730 can access the computer-storage media 740 to identify a particular angular indication of interest associated with the 70°. For instance, the coating protractor and analysis software application 730 may determine that a particular wavelength of green is associated with 70°. As such, in this example, the particular angular indication of interest is the particular wavelength of green.

Once the coating protractor and analysis software application 730 receives a particular angular indication of interest, the coating protractor and analysis software application 730 analyzes images received from the digital camera 710 and attempts to identify the particular angular indication of interest within the images. The coating protractor and analysis software application 730 may analyze the images in real-time as they are recorded by the digital camera or at a later time by retrieving the images from the computer-storage media 740. As the coating protractor and analysis software application 730 analyzes the images, the coating protractor and analysis software application 730 identifies the particular angular indication displayed by the light-based protractor 100 at the particular desired angle.

For example, the coating protractor and analysis software application 730 may determine that the particular angular indication of interest is the particular wavelength of green light. The digital camera 710 may begin to capture images of the light-based protractor and the physical coating surface 700. As depicted by positions 140(a-c) in FIG. 1, the digital camera 710 changes a viewing positions relative to the physical coating surface 700 until the light-based protractor 100 displays the particular angular indication. When the digital camera 710 receives an image with the particular wavelength of green light, the coating protractor and analysis software application 730 determines that the particular angle of interest has been reached. The coating protractor and analysis software application 730 can then further analyze or flag the image as being an image of interest.

This same process can be carried out for multiple different desired angles of interest. For example, after identifying the desired angle associated with the particular wavelength of green light, the coating protractor and analysis software application 730 may request additional images of the physical coating surface 700 associated with various different angles. The requested angles may be chosen based upon a particular specification associated with a coating being validated. Additionally or alternatively, the requested angles may be selected from a set of standard desired angles.

Accordingly, coating protractor and analysis software application 730 may identify a second desired viewing angle with respect to the physical coating surface 700. The coating protractor and analysis software application 730 then identifies a second angular indication displayed by the light-based protractor 100 at the second desired angle (e.g., at position 140b in FIG. 1). The second angular indication may comprise a particular wavelength of red light. The coating protractor and analysis software application 730 receives with the digital camera 710 a second image of the light-based protractor 100 adjacent to the physical coating surface 700. The coating protractor and analysis software application 730 then determines, with a computer processor 750, that the second angular indication (e.g., a particular wavelength of red light) is being displayed by the light-based protractor 100. The coating protractor and analysis software application 730 then stores the second image of the light-based protractor 100 adjacent to the physical coating surface 700 within a database in the computer-storage media 740.

Accordingly, the coating protractor and analysis software application 730 can gather a series of different images taken at different angles with respect to the light-based protractor 100 and the physical coating surface 700. In some examples, the first image of the light-based protractor 100 adjacent to the physical coating surface 700 is a first frame of a digital video, and the second image of the light-based protractor 100 adjacent to the physical coating surface 700 is a second frame of the digital video.

As such, the digital camera 710 may comprise a video recorder. In such a configuration, the digital camera 710 may be moved forward and backward with respect to the light-based protractor 100 and the physical coating surface 700 in order to capture a continuous sequence of different angles of elevation with respect to the plane of movement. Similarly, the digital camera 710 may be moved circumferentially around the light-based protractor 100 and the physical coating surface 700 in order to capture a continuous sequence of different azimuthal angles with respect to the light-based protractor 100 and the physical coating surface 700. The camera movements may be performed manually by a user or automatically using automation, such as a robotic arm.

Further, the coating protractor and analysis software application 730 may comprise various image and/or video processing capabilities. For example, the computer-storage media 740 may comprise specifications for one or more coatings. Upon receiving images of the physical coating surface 700 at different angles, as indicated by the light-based protractor 100, the coating protractor and analysis software application 730 can process the images to validate the coating matches its specification, identify the coating, or perform various other analysis of the coating.

Additionally, the computer-storage media 740 may comprise descriptions of coating characteristics with respect to a continuous set of angles. For example, a particular coating may be characterized with respect to all viewing angles. Using the continuous angle information provided by the light-based protractor 100, the coating protractor and analysis software application 730 may be able to map the video data to continuous data stored within the computer-storage media 740. For instance, the coating protractor and analysis software application 730 may be configured to perform a three-dimensional Fourier transform on the video data and then utilize the three-dimensional Fourier transform to map the video data to continuous angle data stored within the computer-storage media 740. One will appreciate that the usage of continuous data provides additional data for correctly matching, validating, and/or analyzing a coating.

For example, a particular coating may be associated with a specification that associates one or more coating characteristics, including texture characteristics, visible in the physical coating surface with a particular angle. For instance, the specification may comprise various quantitative measurements of texture characteristics. The measurements may describe an expected sparkle color, sparkle intensity, color travel, color flop, and/or any number of other visually identifiable coating characteristics. One or more of the coating characteristics may be specified on a per angle basis for the coating. For example, a texture characteristic visible in the physical coating surface 700 at a particular desired angle may not be universally visible at all angles with respect to the physical coating surface 700. As such, the coating analysis may occur multiple times depending upon the number of images and different angles received of the physical coating surface.

The processing may be performed by an image processing unit 760 within the computer system 720. The image processing unit 760 may comprise a graphics processing unit (GPU), a computer processing unit (CPU), and/or image processing software. The image processing unit 760 may be configured to perform various functions to the image data itself. For example, the image processing unit 760 may sharpen contrast of an image, increase definition, identify colors, and various other convention image processing activities.

A coating processing unit 770 may then perform the analysis of the actual coatings. The coating processing unit 770 may comprise a graphics processing unit (GPU), a computer processing unit (CPU), and/or coating and texture processing software. The coating processing unit 770 may further comprise various sub-processing units, including an angle processing unit 780, a texture processing unit 782, and/or a color processing unit 784. The angle processing unit 780 may be configured to identify angle-unique information from received images. The texture processing unit 782 may be configured to analyze and characterize texture information from received images. The color processing unit 784 may be configured to identify color characteristics of the coatings from received images.

As explained above, the images may be frames of a video. In the situation that a video is received from the digital camera 710, the coating protractor and analysis software application 730 may be able to proactively analyze the physical coating surface at any requested angle. For instance, the angular indication provided by the light-based protractor may provide infinite, continuous resolution on angular views. As such, the coating protractor and analysis software application 730 may be able to identify an angle of interest (e.g., 34°), lookup within a database stored in the computer-storage media 740 an angular indication associated with the angles of interest (e.g., a particular wavelength of light), and then analyze a stored video of the physical coating surface 700 and light-based protractor 100 until the desired angular indication is identified.

Further, the coating protractor and analysis software application 730 may also analyze an entire video file for angle-dependent characteristics of the physical coating surface 700. For example, a database within the computer-storage media may have angle-dependent coating characteristics that are in range of different angles of view. Additionally, the database may store information relating to continuous changes in the coating characteristics that are visible as the digital camera 710 continuously moves between different angles. Using the angular indications provided by the light-based protractor 100, the coating protractor and analysis software application 730 is able to map the information within the database to the video file of the physical coating surface.

Additionally or alternatively, the coating protractor and analysis software application 730 may also be configured to identify a coating based upon the received images. For example, the coating protractor and analysis software application 730 can receive from a digital camera 710 a first image of a light-based protractor 100 positioned adjacent to or on a physical coating surface 700. The image processing unit 760 then parses, with the processor(s) 750, the first image to identify the light-based protractor 100 positioned adjacent to or on the physical coating surface 700. As used herein, "parsing" an image comprises analyzing the digital data associated with the image to extract information. For example, the image processing unit 760 may comprise a machine learning algorithm that is trained to identify the light-based protractor 100. The light-based protractor 100 may also comprise a visual marker that is meant to indicate its presence to the image processing unit 760. For instance, the light-based protractor 100 may comprise a QR code that indicates its position and orientation.

Once the image processing unit 760 has identified the light-based protractor 100, utilizing the methods discussed above, the angle processing unit 780 identifies a particular angular indication being displayed by the light-based protractor 100. For instance, the angle processing unit 780 may access within the computer-storage media 740 a database of angular indications displayed by the light-based protractor 100 along with their respective viewing angles. The angle processing unit 780 then maps the particular angular indication to a particular viewing angle at which the digital camera 710 captured the first image with respect to the light-based protractor 100. The process of mapping comprises digitally identifying the angular indication and then matching the angular indication to an entry within the database of angular indications.

Additionally, the color processing unit 784 parses, using the processor(s) 750, the first image to identify a target color of the physical coating surface 700. The color processing unit 784 may identify a single uniform color stored within the pixels of the first image and/or identify multiple different colors stored in multiple different pixels within the first image. For example, the target color may comprise a red color with silver sparkles. As such, the color processing unit 784 identifies a majority of the pixels with the red color and also identifies various other pixels with the color of the silver sparkles.

The texture processing unit 782 may also parse, using the processor(s) 750, the first image to identify one or more target coating texture characteristics of the physical coating surface 700. The texture processing unit 782 may identify a sparkle intensity, sparkle density, color flop, and any other texture characteristics from the first image. For instance, the texture processing unit 782 may identify that the physical coating surface comprises a silver aluminum flake at a particular size and orientation.

Using the identified target coating the coating processing unit 770 accesses, within a coating database stored within the computer-storage media, one or more coatings associated the target color, wherein each of the one or more coatings is associated with data structures that indicate angle-specific proposed coating texture characteristics at the particular viewing angle. As used herein, a "coating database" comprises a computer database of coating information for a large number of different coatings. The coating processing unit 770 may initially identify a set of proposed coatings that are associated with colors similar to the target coating. The required level of similarity may be dynamically determined such that at least a threshold number of coatings are returned, may be determined by a numerical matching threshold, or may be determined based upon user input.

Using the set of proposed coatings, the coating processing unit 770 identifies, within the coating database, a proposed coating that comprises a proposed color that matches the target color and proposed coating characteristics that match the one or more target coating texture characteristics. For example, the coating processing unit 770 identify a proposed coating within the set of proposed coatings that most closely matches the one or more texture characteristics of the physical coating surface 700. Upon identifying the proposed coating, the coating processing unit 770 can displaying, on a user interface, the proposed coating.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 8:
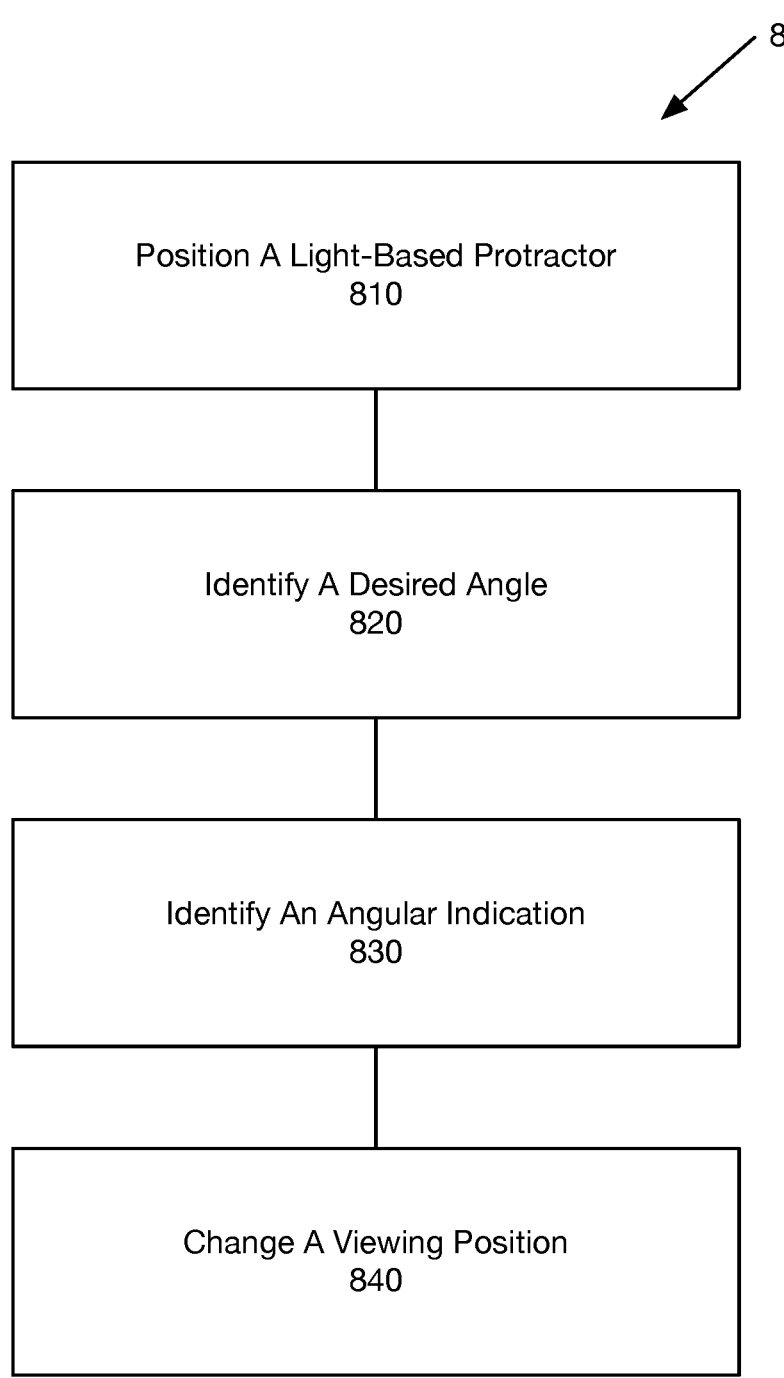
FIG. 8 illustrates a flowchart of acts in a method for identifying angles using a light-based protractor.

FIG. 8 illustrates various steps in a flowchart for a method 800 of identifying angles using a light-based protractor. The method 800 comprises an act 810 of positioning a light-based protractor 100. Act 810 includes positioning a light-based protractor adjacent to or on a physical coating surface, wherein the light-base protractor comprises an optical element constructed of an optically interactive component, the optically interactive component comprising angle-dependent properties responsive to light as described above. For example, as depicted and described with respect to FIGS. 1 and 2, a user may position a light-based protractor 100 on a hood of a vehicle 110 or next to a physical coating surface as depicted in FIG. 3B. The hood of the vehicle comprises a physical coating surface 130. The light-based protractor may comprise an optical element 210 that is constructed of an optically interactive component. The optically interactive component produces unique angular indications depending on the angle at which the optical element 210 is viewed. For instance, the optically interactive component may comprise a prism or a diffraction grating that reflects, refracts, or transmits different wavelengths of light at different angles.

Additionally, method 800 also comprises an act 820 of identifying a desired angle 820. Act 820 includes identifying a particular desired viewing angle with respect to the physical coating surface. For example, as depicted and explained with respect to FIGS. 1 and 7, a user or a computer-system may have access to coating specifications that specify specific angle-dependent characteristics of a coating. To validate the coating, the user or the computer system may select a particular desired angle from the specifications.

Method 800 also comprises an act 830 of identifying an angular indication. Act 830 includes identifying a particular angular indication displayed by the light-based protractor at the particular desired angle. For example, as depicted and described with respect to FIGS. 1 and 3A, the light-based protractor may reflect, refract, or transmit a particular wavelength of light at a particular angle. Each light-based protractor 100 may be associated with a chart or reference materials that describe angular indications as the light that is reflected, refracted, or transmitted from the light-based protractor 100 at a variety of different angles. The chart or reference materials may only indicate angular references for a set number of commonly used angles within the industry.

Further, method 800 comprises an act 840 of changing a viewing position. Act 840 includes changing a viewing position relative to the physical coating surface until the light-based protractor displays the particular angular indication. For example, as depicted and described with respect to FIG. 1, a digital camera 140 can change positions 140 (*a-c*) until the desired angular indication is depicted by the light-based protractor 100. The viewing position of the camera may be changed manually by a user and/or automatically by a machine (such as a robotic arm). The camera may take pictures at each position and/or take continuous video images while the camera is being moved.

One will appreciate that the descriptions of methods and method acts provided herein are only exemplary and that a number of different methods and variations of methods can be utilized with respect to the disclosed inventions. For example, FIG. 9 illustrates a flowchart of acts in another method 900 for identifying angles using a light-based protractor 100. Method 900 comprises an act 910 of identifying a desired angle. Act 910 includes identifying a particular desired viewing angle with respect to the physical coating surface. For example, as depicted and explained with respect to FIGS. 1 and 7, a user or a computer-system may have access to coating specifications that specify specific angle-dependent characteristics of a coating. To validate the coating, the user or the computer system may select a particular desired angle from the specifications.

Method 900 also comprises an act 920 of identifying an angular indication. Act 920 includes identifying a particular angular indication displayed by the light-based protractor 100 at the particular desired angle. For example, as depicted and described with respect to FIGS. 1 and 3, the light-based protractor may reflect, refract, transmit, scatter, or polarize a particular wavelength of light at a particular angle. Each light-based protractor 100 may be associated with a chart or reference materials that describe angular indications as the light that is reflected, refracted, or transmitted from the light-based protractor 100 at a variety of different angles. The chart or reference materials only indicate angular references for a set number of commonly used angles within the industry.

Additionally, method 900 comprises an act 930 of receiving an image of a light-based protractor 930. Act 930 includes receiving with the digital camera an image of the light-based protractor 100 adjacent to the physical coating surface. For example, as depicted and explained with respect to FIGS. 1 and 7, a digital camera (shown at 710 in FIGS. 7 and 140 in FIG. 1) can capture images, including video, of the light-based protractor 100 mounted on a physical coating surface 700.

Method 900 also comprises an act 940 of determining that the angular indication is being displayed. Act 940 includes determining, with the one or more processors, that the particular angular indication is being displayed by the light-based protractor 100. For example, as depicted and explained with respect to FIGS. 1 and 7, as the digital camera (shown at 710 in FIGS. 7 and 140 in FIG. 1) or user moves around the light-based protractor different angular indications are displayed until the digital camera 710, 140 or user are positioned at the desired angle, at which time the desired angular indication will be displayed.

Further, method 900 comprises an act 950 of storing the image. Act 950 includes storing the image of the light-based protractor adjacent to or on the physical coating surface within memory. For example, as depicted and described with respect to FIG. 7, a computer system 720 stores images of the physical coating surface 700 received from the digital camera 710 within a database in the computer-storage media 740.

Additionally, one will appreciate that the descriptions of methods and method acts provided herein are only exemplary and that a number of different methods and variations of methods can be utilized with respect to the disclosed inventions. For example, FIG. 10 illustrates a flowchart of acts in another method 1000 for angle detection and coating analysis. Method 1000 comprises an act 1010 of receiving a first image. Act 1010 includes receiving with a digital camera 710 a first image of a light-based protractor 100 positioned adjacent to or on a physical coating surface 700. For example, as depicted and described with respect to FIGS. 1 and 7, a digital camera 710 may take images of a light-based protractor 100 positioned on or near a physical coating surface.

Method 1000 also comprises an act 1020 of parsing a first image. Act 1020 includes parsing, with a computer processor, the first image to identify the light-based protractor 100 positioned adjacent to or on the physical coating surface 700. For example, as depicted and described with respect to FIG. 7, the image processing unit 760 parses an image and determines the presence and/or location of the light-based protractor 100 within the image.

Additionally, method 1000 comprises an act 1030 of identifying a particular angular indication. Act 1030 includes identifying a particular angular indication being displayed by the light-based protractor 100. For example, as depicted and described with respect to FIGS. 1 and 7, the light-based protractor 100 displays angular indications that indicate the angle at which a user is viewing the light-based protractor 100. For instance, the angular indication may comprise a particular color indicating the angle of view. The angle processing unit 780 is configured to identify the viewing angle based upon the angular indication.

Method 1000 comprises an act 1040 of mapping the particular angular indication to a viewing angle. Act 1040 includes mapping the particular angular indication to a particular viewing angle at which the digital camera 710 captured the first image with respect to the light-based protractor 100. For example, the angle processing unit 780 identifies the angular indication presented by the light-based protractor 100 and then maps the angular indication to a particular angle using a database of angular-indication-to-coating mappings that is stored in the computer-storage media 740.

In addition, method 1000 comprises an act 1050 of identifying a target color in the first image. Act 1050 includes parsing, with a processor, the first image to identify a target color of the physical coating surface. For example, as depicted and described in FIG. 7, the color processing unit 784 analyzes the pixels within the digital first image to identify one or more colors.

Method 1000 further comprises an act 1060 of identifying target coating texture characteristics. Act 1060 includes parsing, with the computer processor, the first image to identify one or more target coating texture characteristics of the physical coating surface. For example, as depicted and described in FIG. 7, the texture processing unit 782 analyzes the digital first image to identify one or more texture characteristics. The texture processing unit 782 may utilize conventional methods for identifying the texture characteristics, nevertheless, the addition of the angular indications may provide novel and beneficial advantages within the conventional methods.

Additionally, method 1000 comprises an act 1070 of accessing one or more coatings associated with the target coating. Act 1070 includes accessing, within a coating database, one or more coatings associated the target color, wherein each of the one or more coatings is associated with data structures that indicate angle-specific proposed coating texture characteristics at the particular viewing angle. For example, as depicted and explained with respect to FIG. 7, the coating processing unit 770 access a coating database within the computer-storage media 740. The coating database comprises a large set of coatings and their associated characteristics and colors.

Further, method 1000 comprises an act 1080 of identifying a proposed coating. Act 1080 includes identifying, within the coating database, a proposed coating that comprises a proposed color that matches the target color and proposed coating characteristics that match the one or more target coating texture characteristics. For example, the coating processing unit 770 identifies a proposed coating that most closely matches the target coating and target texture characteristics of the physical coating surface.

Further still, method 1000 comprises an act 1090 of displaying the proposed coating. Act 1090 includes displaying, on a user interface, the proposed coating. For example, the computer system 720 may comprise a user interface that is configured to display an image, name, formulation, and/or other information relating to the proposed coating.

In view of the above, one will appreciate the technical advance provided by the disclosed inventions. For example, a light-based protractor 100 is described that is configured to be handheld and easily placed on a physical coating surface. Additionally, the light-based protractor 100 may be formable such that it at least partially forms to a non-planar surface. A user may utilize the light-based protractor 100 to quickly and accurately identify the angle at which they are viewing a physical coating surface.

Further, the light-based protractor 100 can also be used by coating protractor and analysis software application 730 to digitally analyze a physical coating surface. For instance, a set of images, such as frames within a video file, may be provided to the coating protractor and analysis software application 730. The coating protractor and analysis software application 730 can process and analyze the images in order to analyze coating characteristics that are associated with the physical coating surface. The angular indications generated by the light-based protractor may be used by the coating protractor and analysis software application 730 to correlate the images with the angles of view.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

In view of the foregoing the present invention relates for example, without being limited thereto, to the following aspects:

1. A method for angle detection and coating analysis comprising:

receiving with a digital camera a first image of a light-based protractor positioned adjacent to or on a physical coating surface;

parsing, with a computer processor, the first image to identify the light-based protractor positioned adjacent to or on the physical coating surface;

identifying a particular angular indication being displayed by the light-based protractor;

mapping the particular angular indication to a particular viewing angle at which the digital camera captured the first image with respect to the light-based protractor;

parsing, with a processor, the first image to identify a target color of the physical coating surface;

parsing, with the computer processor, the first image to identify one or more target coating texture characteristics of the physical coating surface;

accessing, within a coating database, one or more coatings associated the target color, wherein each of the one or more coatings is associated with data structures that indicate angle-specific proposed coating texture characteristics at the particular viewing angle;

identifying, within the coating database, a proposed coating that comprises a proposed color that matches the target color and proposed coating characteristics that match the one or more target coating texture characteristics; and displaying, on a user interface, the proposed coating.

2. The method as recited in claim 1, wherein mapping the particular angular indication to the particular viewing angle further comprises:

identifying a first angular indication displayed by the light-based protractor at a current viewing angle; and changing a viewing position relative to the physical coating surface until the light-based protractor displays the particular angular indication that is associated with the particular viewing angle.

3. The method as recited in claim 1, wherein the light-based protractor comprises an optical element constructed of an optically interactive component, the optically interactive component comprising angle-dependent properties responsive to light 4. The method as recited in claim 2, wherein the optically interactive component comprises a diffraction grating.

5. The method as recited in claim 1, wherein the light-based protractor is configured to be handheld.

6. The method as recited in claim 1, further comprising:

identifying a second desired viewing angle with respect to the physical coating surface;

identifying a second angular indication displayed by the light-based protractor at the second desired viewing angle;

receiving with the digital camera a second image of the light-based protractor adjacent to or on the physical coating surface;

determining, with a computer processor, that the second angular indication is being displayed by the light-based protractor; and storing the second image of the light-based protractor adjacent to the physical coating surface within a database.

7. The method as recited in claim 6, wherein a first image of the light-based protractor adjacent to or on the physical coating surface is a first frame of a digital video and the second image of the light-based protractor adjacent to or on the physical coating surface is a second frame of the digital video.

8. A computer system for angle detection and coating analysis comprising:

one or more processors; and one or more computer-readable media having stored thereon executable instructions that when executed by the one or more processors configure the computer system to perform at least the following:

receive with a digital camera a first image of a light-based protractor positioned adjacent to or on a physical coating surface;

parse, with a computer processor, the first image to identify the light-based protractor positioned adjacent to or on the physical coating surface;

identify a particular angular indication being displayed by the light-based protractor;

map the particular angular indication to a particular viewing angle at which the digital camera captured the first image with respect to the light-based protractor;

parse, with a processor, the first image to identify a target color of the physical coating surface;

parse, with the computer processor, the first image to identify one or more target coating texture characteristics of the physical coating surface;

access, within a coating database, one or more coatings associated the target color, wherein each of the one or more coatings is associated with data structures that indicate angle-specific proposed coating texture characteristics at the particular viewing angle;

identify, within the coating database, a proposed coating that comprises a proposed color that matches the target color and proposed coating characteristics that match the one or more target coating texture characteristics; and display, on a user interface, the proposed coating.

9. The computer system as recited in claim 8, wherein mapping the particular angular indication to the particular viewing angle further comprises:

identifying a first angular indication displayed by the light-based protractor at a current viewing angle; and changing a viewing position relative to the physical coating surface until the light-based protractor displays the particular angular indication that is associated with the particular viewing angle.

10. The computer system as recited in claim 8, wherein the light-based protractor comprises an optical element constructed of an optically interactive component, the optically interactive component comprising angle-dependent properties responsive to light 11. The computer system as recited in claim 10, wherein the optically interactive component comprises a diffraction grating.

12. The computer system as recited in claim 8, wherein the light-based protractor is configured to be handheld.

13. The computer system as recited in claim 8, wherein the executable instructions include instructions that are executable to configure the computer system to:

identify a second desired viewing angle with respect to the physical coating surface;

identify a second angular indication displayed by the light-based protractor at the second desired viewing angle;

receive with the digital camera a second image of the light-based protractor adjacent to or on the physical coating surface;

determine, with a computer processor, that the second angular indication is being displayed by the light-based protractor; and store the second image of the light-based protractor adjacent to the physical coating surface within a database.

14. The computer system as recited in claim 13, wherein a first image of the light-based protractor adjacent to or on the physical coating surface is a first frame of a digital video and the second image of the light-based protractor adjacent to or on the physical coating surface is a second frame of the digital video.

15. A computer program product for use at a computer system, the computer program product for implementing a method for angle detection and coating analysis, the computer program product comprising one or more computer storage media having stored thereon computer-executable instructions that, when executed at a processor, cause the computer system to perform the method, including the following:

receiving with a digital camera a first image of a light-based protractor positioned adjacent to or on a physical coating surface;

parsing, with a computer processor, the first image to identify the light-based protractor positioned adjacent to or on the physical coating surface;

identifying a particular angular indication being displayed by the light-based protractor;

mapping the particular angular indication to a particular viewing angle at which the digital camera captured the first image with respect to the light-based protractor;

parsing, with a processor, the first image to identify a target color of the physical coating surface;

parsing, with the computer processor, the first image to identify one or more target coating texture characteristics of the physical coating surface;

accessing, within a coating database, one or more coatings associated the target color, wherein each of the one or more coatings is associated with data structures that indicate angle-specific proposed coating texture characteristics at the particular viewing angle;

identifying, within the coating database, a proposed coating that comprises a proposed color that matches the target color and proposed coating characteristics that match the one or more target coating texture characteristics; and displaying, on a user interface, the proposed coating.

16. The computer program product as recited in claim 15, wherein mapping the particular angular indication to the particular viewing angle further comprises:

identifying a first angular indication displayed by the light-based protractor at a current viewing angle; and changing a viewing position relative to the physical coating surface until the light-based protractor displays the particular angular indication that is associated with the particular viewing angle.

17. The computer program product as recited in claim 15, wherein the light-based protractor comprises an optical element constructed of an optically interactive component, the optically interactive component comprising angle-dependent properties responsive to light 18. The computer program product as recited in claim 16, wherein the optically interactive component comprises a diffraction grating.

19. The computer program product as recited in claim 15, wherein the light-based protractor is configured to be handheld.

20. The computer program product as recited in claim 15, further comprising:

identifying a second desired viewing angle with respect to the physical coating surface;

identifying a second angular indication displayed by the light-based protractor at the second desired viewing angle;

receiving with the digital camera a second image of the light-based protractor adjacent to or on the physical coating surface;

determining, with a computer processor, that the second angular indication is being displayed by the light-based protractor; and storing the second image of the light-based protractor adjacent to the physical coating surface within a database.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for angle detection and coating analysis comprising:

identifying a particular angular indication being displayed by a light-based protractor that is positioned adjacent to or on a physical coating surface;

mapping the particular angular indication to a particular viewing angle with respect to the physical coating surface;

identifying one or more target coating texture characteristics of the physical coating surface that are visibly at the particular viewing angle;

accessing, within a coating database, information relating to one or more coatings associated with the one or more target coating texture characteristics, wherein each of the one or more coatings is associated with data structures that indicate angle-specific proposed coating texture characteristics at the particular viewing angle;

identifying, within the coating database, a proposed coating that comprises proposed coating characteristics that match the one or more target coating texture characteristics; and displaying, on a user interface, the proposed coating.

2. The method as recited in claim 1, wherein the light-based protractor comprises an optical element constructed of an optically interactive component, the optically interactive component comprising angle-dependent properties responsive to light.

3. The method as recited in claim 2, wherein the optically interactive component comprises a diffraction grating.

4. The method as recited in claim 2, wherein the optically interactive component comprises dichroic stacked lenses.

5. The method as recited in claim 2, wherein the optically interactive component comprises a hologram.

6. The method as recited in claim 1, wherein the light-based protractor is configured to be handheld.

7. The method as recited in claim 1, wherein mapping the particular angular indication to the particular viewing angle further comprises:

identifying a first angular indication displayed by the light-based protractor at a current viewing angle; and changing a viewing position relative to the physical coating surface until the light-based protractor displays the particular angular indication that is associated with the particular viewing angle.

8. A computer system for angle detection and coating analysis comprising: one or more processors; and one or more computer-readable media having stored thereon executable instructions that when executed by the one or more processors configure the computer system to perform at least the following:

identify a particular angular indication being displayed by a light-based protractor that is positioned adjacent to or on a physical coating surface;

map the particular angular indication to a particular viewing angle with respect to the physical coating surface;

identify one or more target coating texture characteristics of the physical coating surface that are visibly at the particular viewing angle;

access, within a coating database, information relating to one or more coatings associated with the one or more target coating texture characteristics, wherein each of the one or more coatings is associated with data structures that indicate angle-specific proposed coating texture characteristics at the particular viewing angle;

identify, within the coating database, a proposed coating that comprises proposed coating characteristics that match the one or more target coating texture characteristics; and display, on a user interface, the proposed coating.

9. The computer system as recited in claim 8, wherein the light-based protractor comprises an optical element constructed of an optically interactive component, the optically interactive component comprising angle-dependent properties responsive to light.

10. The computer system as recited in claim 9, wherein the optically interactive component comprises a diffraction grating.

11. The computer system as recited in claim 9, wherein the optically interactive component comprises dichroic stacked lenses.

12. The computer system as recited in claim 9, wherein the optically interactive component comprises a hologram.

13. The computer system as recited in claim 8, wherein the light-based protractor is configured to be handheld.

14. The computer system as recited in claim 13, wherein mapping the particular angular indication to the particular viewing angle further comprises:

identifying a first angular indication displayed by the light-based protractor at a current viewing angle; and changing a viewing position relative to the physical coating surface until the light-based protractor displays the particular angular indication that is associated with the particular viewing angle.

15. A computer program product for use at a computer system, the computer program product for implementing a method for angle detection and coating analysis, the computer program product comprising one or more computer storage media having stored thereon computer-executable instructions that, when executed at a processor, cause the computer system to perform the method, including the following:

identifying a particular angular indication being displayed by a light-based protractor that is positioned adjacent to or on a physical coating surface;

mapping the particular angular indication to a particular viewing angle with respect to the physical coating surface;

identifying one or more target coating texture characteristics of the physical coating surface that are visibly at the particular viewing angle;

accessing, within a coating database, information relating to one or more coatings associated with the one or more target coating texture characteristics, wherein each of the one or more coatings is associated with data structures that indicate angle-specific proposed coating texture characteristics at the particular viewing angle;

identifying, within the coating database, a proposed coating that comprises proposed coating characteristics that match the one or more target coating texture characteristics; and displaying, on a user interface, the proposed coating.

16. The computer program product as recited in claim 15, wherein the light-based protractor comprises an optical element constructed of an optically interactive component, the optically interactive component comprising angle-dependent properties responsive to light.

17. The computer program product as recited in claim 16, wherein the optically interactive component comprises a diffraction grating.

18. The computer program product as recited in claim 16, wherein the optically interactive component comprises dichroic stacked lenses.

19. The computer program product as recited in claim 16, wherein the optically interactive component comprises a hologram.

20. The computer program product as recited in claim 15, wherein the light-based protractor is configured to be handheld.

* * * * *